(12) United States Patent
Ishida (10) Patent No.: US 10,069,923 B2
(45) Date of Patent: Sep. 4, 2018

(54) INFORMATION PROCESSING APPARATUS, CONTROL METHOD THEREFOR AND COMPUTER-READABLE STORAGE MEDIUM

(71) Applicant: CANON KABUSHIKI KAISHA, Tokyo (JP)

(72) Inventor: Tomoya Ishida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 14/549,931

(22) Filed: Nov. 21, 2014

(65) Prior Publication Data

US 2015/0163290 A1     Jun. 11, 2015

(30) Foreign Application Priority Data

Dec. 11, 2013  (JP) ................................ 2013-256438

(51) Int. Cl.
*H04L 29/08*  (2006.01)
*H04W 80/08*  (2009.01)
*H04L 29/06*  (2006.01)

(52) U.S. Cl.
CPC ............ *H04L 67/16* (2013.01); *H04L 67/303* (2013.01); *H04L 69/08* (2013.01); *H04W 80/085* (2013.01)

(58) Field of Classification Search
CPC ................................ H04L 67/16; H04L 45/02
USPC ....................................................... 709/201
See application file for complete search history.

(56) References Cited

U.S. PATENT DOCUMENTS

| | | | | |
|---|---|---|---|---|
| 2008/0301267 A1* | 12/2008 | Chang | ................... | H04L 41/046 709/220 |
| 2012/0243524 A1* | 9/2012 | Verma | ................... | H04W 48/08 370/338 |
| 2013/0016628 A1* | 1/2013 | Bertani | ................. | H04L 41/046 370/255 |
| 2013/0282886 A1* | 10/2013 | Taylor | .................... | H04L 41/12 709/223 |
| 2014/0357269 A1* | 12/2014 | Zhou | ..................... | H04W 8/005 455/434 |

FOREIGN PATENT DOCUMENTS

| | | |
|---|---|---|
| JP | 2005-157612 | 6/2005 |
| JP | 2009-31899 | 2/2009 |
| JP | 2011-013964 | 1/2011 |

OTHER PUBLICATIONS

Japanese Office Action dated Aug. 28, 2017 during prosecution of related Japanese application No. 2013-256438.

* cited by examiner

*Primary Examiner* — Douglas Blair
*Assistant Examiner* — Jonathan A Sparks
(74) *Attorney, Agent, or Firm* — Fitzpatrick, Cella, Harper & Scinto

(57) ABSTRACT

A device on a network is searched for by using the first protocol, and the first device information is acquired. The second device information about the second protocol is acquired from a device on the network. The second device information is preferentially processed over the first device information.

18 Claims, 9 Drawing Sheets

INFORMATION PROCESSING APPARATUS, CONTROL METHOD THEREFOR AND COMPUTER-READABLE STORAGE MEDIUM

BACKGROUND OF THE INVENTION

Field of the Invention

The present invention relates to an information processing technique for searching for a device on a network.

Description of the Related Art

In recent years, along with popularization of network-compatible devices, discovery protocols for searching for a device on a network via the network have been developed. There already exist various discovery protocols. Examples of the discovery protocols are a protocol (to be referred to as a proprietary protocol hereinafter) proprietarily developed by a vendor for developing a device, and an open protocol like Bonjour® used for Mac OS X® as an operating system provided by Apple. Bonjour is based on specifications called Zero Configuration Networking stipulated by IETF.

While there exist various discovery protocols, devices supporting a plurality of protocols including a proprietary protocol and a standard protocol like Bonjour increase. Japanese Patent Laid-Open No. 2009-31899 discloses a technique of more reliably searching for a device supporting a specific protocol by performing a search using a predetermined network protocol and a search using another protocol in order to transfer data using the predetermined network protocol.

If, however, a search is performed using each of a plurality of discovery protocols, it may be impossible to acquire desired device information since, for example, the detection timings by the respective discovery protocols are different from each other.

As an example for explaining this problem, assume a case in which a device supports two protocols, that is, a proprietary protocol and Bonjour, and device information is provided to the user by displaying it as a search result. Assume also that only a MAC address is transmitted as device information using the proprietary protocol, and a Bonjour service name is transmitted using Bonjour. In this case, it is desirable to preferentially display the Bonjour service name transmitted using Bonjour. This is because the MAC address transmitted using the proprietary protocol is a defined 48-bit number such as "00:11:22:33:44:55", and it is difficult for the user to identify a device corresponding to the MAC address. To the contrary, since the user can independently set a Bonjour service name, he/she readily specifies a device. Therefore, it is desirable to preferentially display the Bonjour service name over the MAC address.

There are various devices on a network, such as a device supporting only a proprietary protocol, a device supporting only Bonjour, and a device supporting both the protocols. Consequently, both the proprietary protocol and Bonjour may be used to search for devices. This is because if a search is performed using one of the protocols, it becomes impossible to discover a device that does not support the protocol. If both the proprietary protocol and Bonjour are used to search for devices, device detection timings by the two protocols may be different from each other. If detection of a device using Bonjour is quicker, a Bonjour service name is acquired. After that, if the device is detected using the proprietary protocol, and the device information is overwritten by the MAC address, it is impossible to recognize the Bonjour service name.

Furthermore, even if a device is detected first using the proprietary protocol that is not prioritized, and then the device is detected using Bonjour, the user cannot recognize a Bonjour service name unless the Bonjour service name is preferentially presented as a search result. When the user wants to use a device according to the proprietary protocol, and acquire a Bonjour service name, even if the Bonjour service name is acquired using Bonjour, it may be impossible to use the device according to the proprietary protocol.

This problem may arise not only for Bonjour and the proprietary protocol but also for various protocols with which pieces of information acquirable by a search are different from each other. In addition, the above problem may arise not only when a search result is displayed to be presented to the user but also when a search result is used for purposes other than a display purpose.

SUMMARY OF THE INVENTION

The present invention provides an information processing technique capable of searching for a device on a network and performing processing using appropriate device information.

To achieve the above object, an information processing apparatus according to the present invention has the following arrangement. That is, an information processing apparatus comprising: a first acquisition unit configured to search for a device on a network using a first protocol, and acquire first device information from the searched device; a second acquisition unit configured to acquire second device information about a second protocol from a device on the network; and a processing unit configured to preferentially process the second device information acquired by the second acquisition unit over the first device information acquired by the first acquisition unit.

According to the present invention, it is possible to search for a device on a network and preferentially perform processing using appropriate device information.

Further features of the present invention will become apparent from the following description of exemplary embodiments (with reference to the attached drawings).

DESCRIPTION OF THE EMBODIMENTS

An embodiment of the present invention will be described in detail below with reference to the accompanying drawings.

An example of the connection state between devices and a PC (Personal Computer) as an example of an information processing apparatus according to the embodiment will be explained with reference to FIG. 1.

Figure 1:
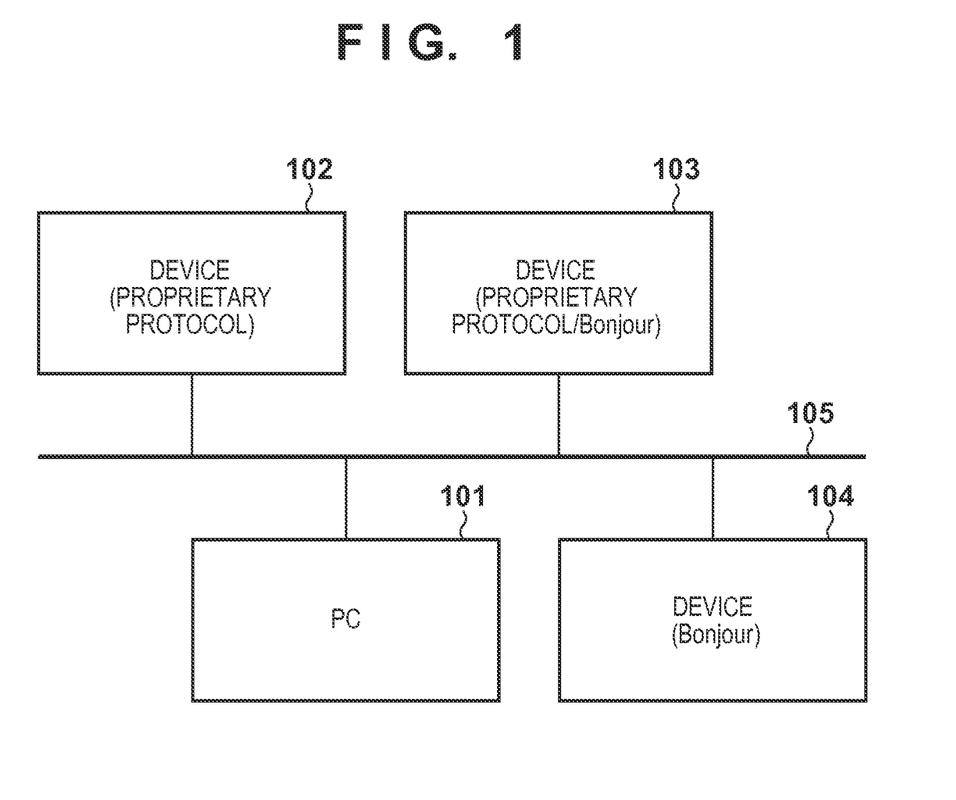
FIG. 1 is a block diagram showing the connection state between a PC and devices.

Referring to FIG. 1, reference numeral 101 denotes a PC as an information processing apparatus; and 102, 103, and 104, devices as peripherals. Note that the device 104 may be an apparatus such as a printer, copying machine, facsimile apparatus, scanner, digital camera, or PC, or a multi-function apparatus. The device 102 is a device supporting only a proprietary protocol as a discovery protocol serving as a communication protocol. The device 103 is a device supporting both the proprietary protocol and Bonjour®. The device 104 is a device supporting only Bonjour. As described above, devices supporting various discovery protocols exist on a network 105.

Note that the devices 102, 103, and 104 are connected to the PC 101 via the network 105 formed by Ethernet® as the data link layer of the OSI reference model. In the network 105, a protocol in the network layer corresponds to the Internet protocol (IP). The discovery protocol is a communication protocol in the application layer. The network 105 is not limited to a wired network, and may be a wireless network.

It is possible to acquire a Bonjour service name, an IP address, a MAC address, and the like as device information by using Bonjour. The Bonjour service name is a name arbitrarily settable by the user in a device. The Bonjour service name is a name commonly usable for a wired network and wireless network. Only the MAC address of a device is acquired as device information by using the proprietary protocol. Note that HTTP, FTP, or the like may be used as a communication protocol in the application layer, instead of Bonjour or the proprietary protocol. For example, a device may have a Web server function, and hold various kinds of information including device information as a home page described in HTML or the like, and HTTP, FTP, or the like may be used by a PC to acquire the information by a general-purpose Web browser.

Figure 2:
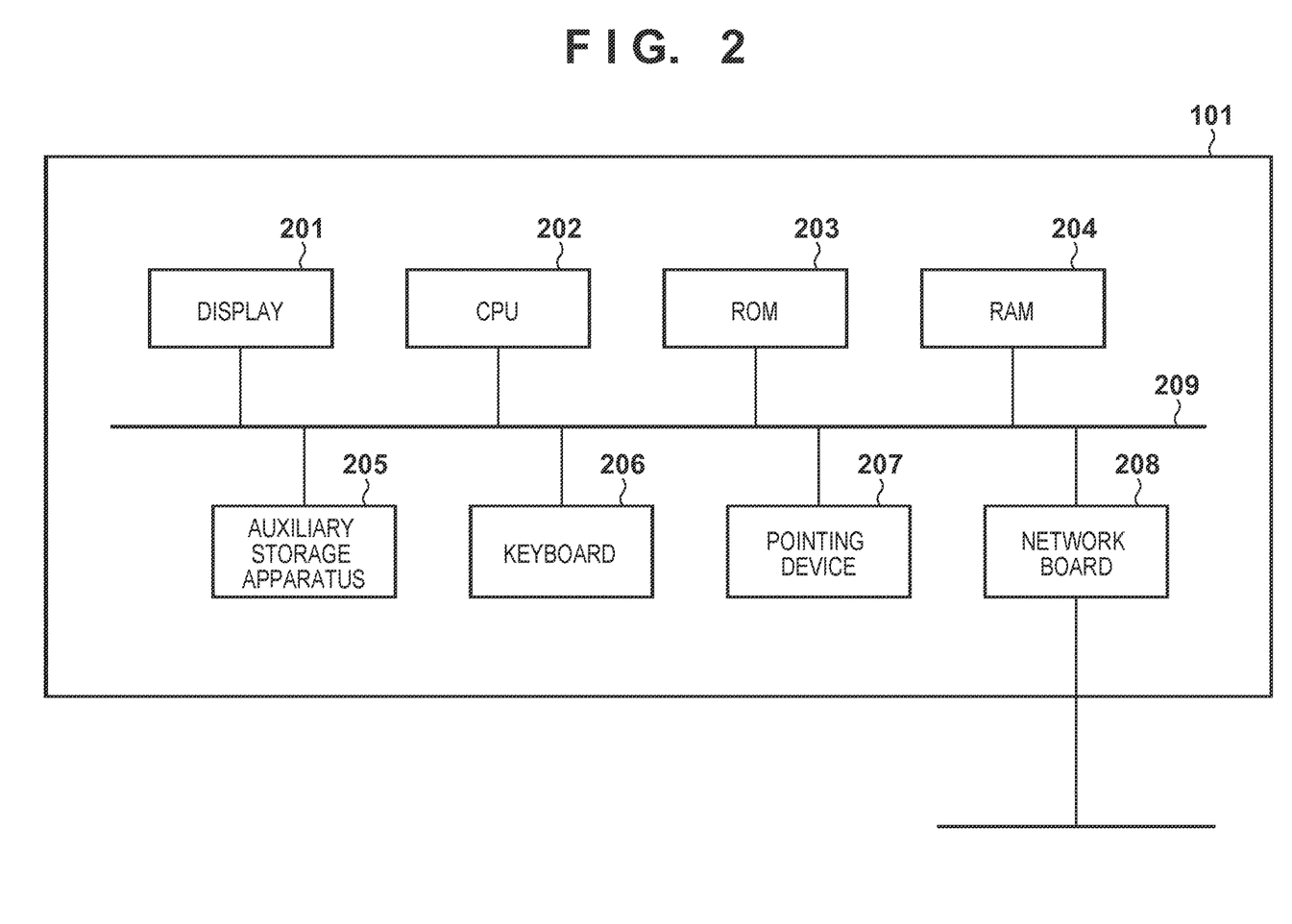
FIG. 2 is a block diagram showing the hardware arrangement of the PC.

FIG. 2 is a block diagram showing the hardware arrangement of the PC 101. The PC 101 can be implemented by installing predetermined software in a general-purpose PC or smart device.

In the PC 101, a display 201 displays the UI and execution state of an application or driver. A CPU 202 reads out a program such as an application or driver from a ROM 203, and executes the program. The ROM 203 stores basic software such as BIOS, and various programs for implementing processing executed by the PC 101. A RAM 204 temporarily stores data and software such as applications and drivers. An auxiliary storage apparatus 205 is formed by a storage apparatus such as a hard disk, and stores software (programs) such as an operating system (OS), applications, drivers, and various modules. A keyboard 206 and a pointing device 207 function as input devices for inputting an instruction from the user. An example of the pointing device 207 is a mouse. The display 201 may take a touch panel form, and may accept an input from the user by a touch panel. A network board 208 communicates with a device via the network. The various components forming the PC 101 are interconnected via a bus 209.

The drivers stored in the auxiliary storage apparatus 205 include device drivers (scanner driver, printer driver, camera driver, and the like) for controlling the devices 102 to 104. The drivers also include a display control driver for controlling display of the display 201. Furthermore, the drivers include a keyboard driver for controlling the keyboard 206, and a pointing device driver for controlling the pointing device 207. The drivers include a network driver used by the network board 208 to control communication in the network 105. The applications stored in the auxiliary storage apparatus 205 include a function of performing discovery processing using Bonjour (searching for a device and acquiring device information of the device), and a function of performing discovery processing using the proprietary protocol. Note that the function of performing discovery processing using Bonjour or the proprietary protocol may be provided in a dedicated module, and the module may be called by an application or device driver to execute discovery processing. The PC 101 can use HTTP, FTP, or the like as a communication protocol in the application layer, instead of Bonjour or the proprietary protocol.

Figure 3:
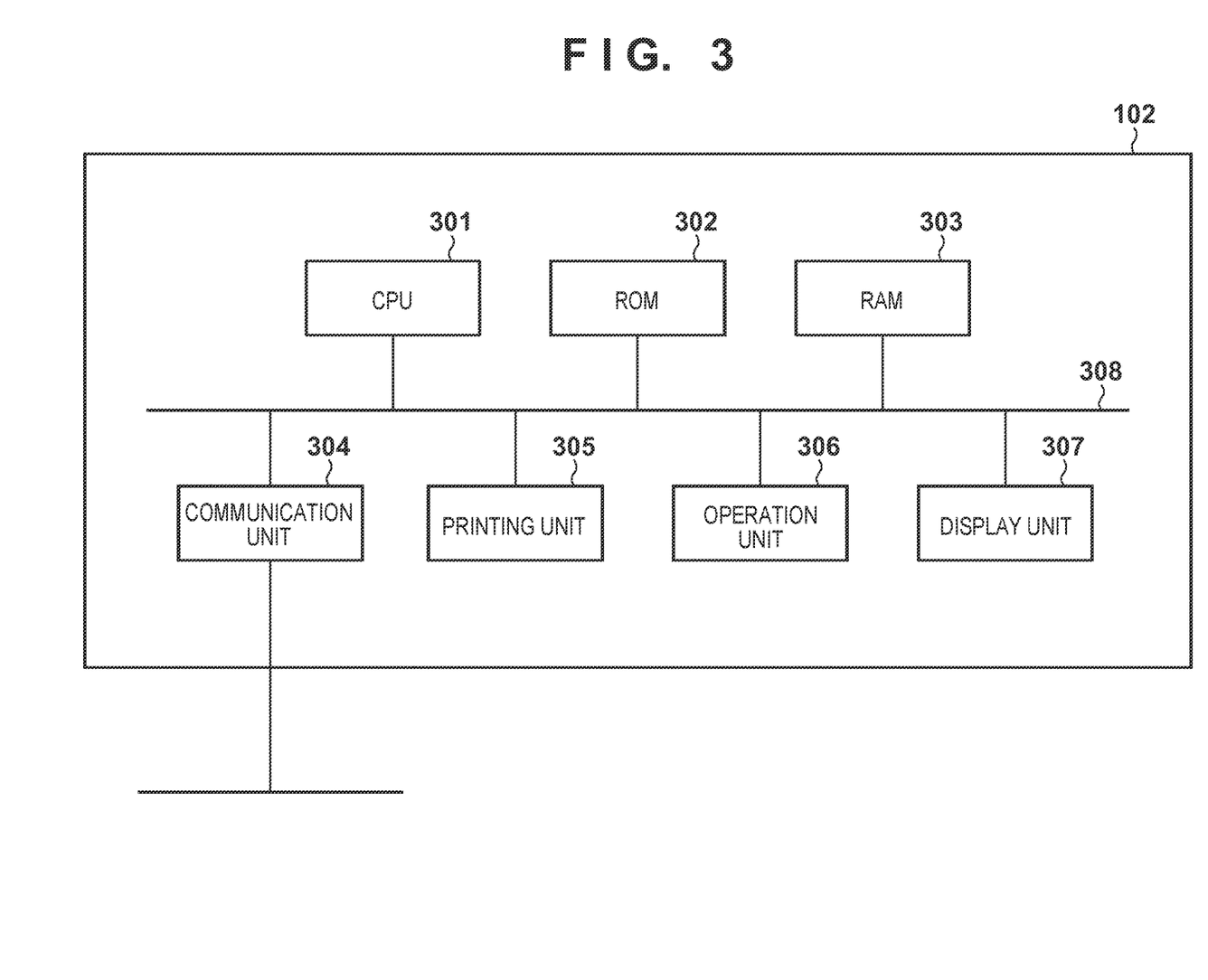
FIG. 3 is a block diagram showing the hardware arrangement of the device.

FIG. 3 is a block diagram showing the hardware arrangement of each of the devices 102, 103, and 104. The hardware arrangements of the devices 102, 103, and 104 are the same. Therefore, only the device 102 will be described below and a description of the devices 103 and 104 will be omitted.

Referring to FIG. 3, a CPU 301 is formed from a microprocessor or the like, and functions as the central processing apparatus of the device 102. The CPU 301 loads programs recorded in a ROM 302 to a RAM 303, and executes the programs, thereby controlling a communication unit 304, a printing unit 305, an operation unit 306, a display unit 307, and the like.

The ROM 302 stores various programs for implementing processing executed by the device 102. The RAM 303 is used as a work area for the CPU 301, and temporarily stores various data. If the device supports Bonjour, the device name of the device, which has been arbitrarily input by the user, is stored as a Bonjour service name in the RAM 204. The communication unit 304 communicates with another device via the network. The printing unit 305 prints data on a printing medium. The operation unit 306 is formed by an input device such as a touch panel. The display unit 307 displays various kinds of information and a UI for operating the device 102. The various components forming the device 102 are interconnected via a bus 308.

Although a case in which the device is a printer including the printing unit 305 has been explained, the device is not limited to the printer. Depending on the type of the device, another component is included, instead of or in addition to the printing unit 305. For example, if the device has a scanner function, a reading unit for reading an image on a document is provided as another component. Note that if the device has a plurality of functions (services), a Bonjour service name may be registered for each function, and the device may send a Bonjour service name corresponding to contents of a service contained in a search request.

First Embodiment

Figure 4:
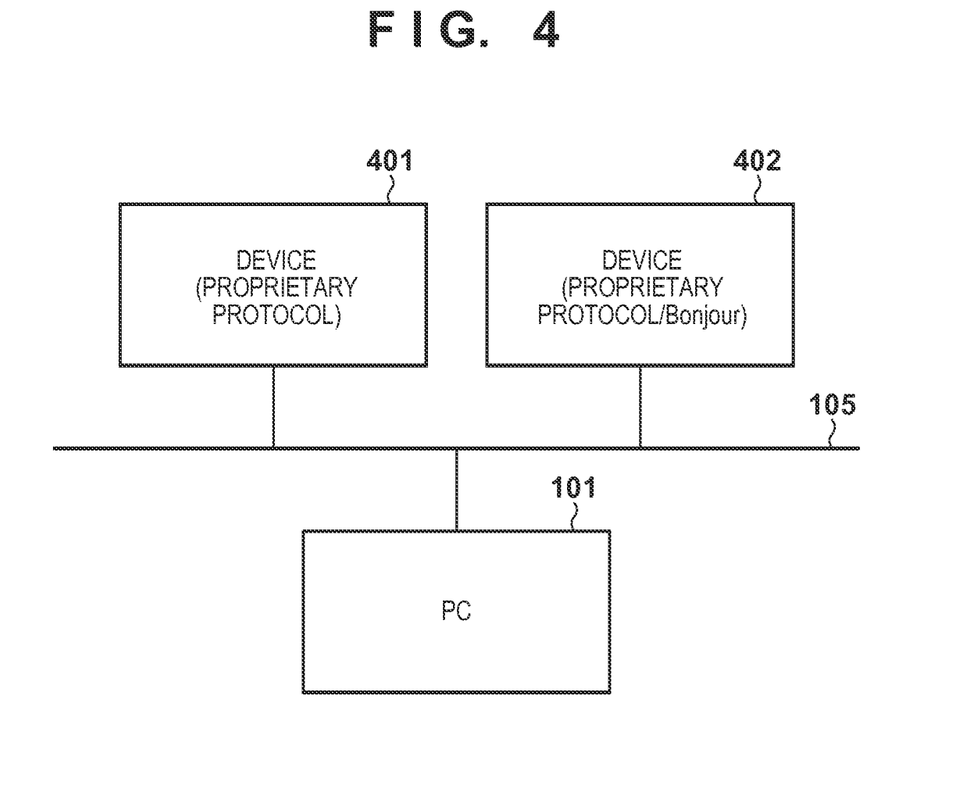
FIG. 4 is a block diagram showing the connection state between a PC and devices according to the first embodiment.

FIG. 4 is a block diagram showing the connection state between a PC and devices according to the first embodiment.

Referring to FIG. 4, a PC 101 and devices 401 and 402 are connected via a network 105. The device 401 corresponds to the device 102 of FIG. 1, and supports only the proprietary protocol. The device 402 corresponds to the device 103 of FIG. 1, and supports two protocols, that is, the proprietary protocol and Bonjour. As described above, in the first embodiment, assume that all devices support the proprietary protocol. Note that each of the devices 401 and 402 responds to a search request from the PC 101, and other devices can be connected to the network 105.

Figure 5:
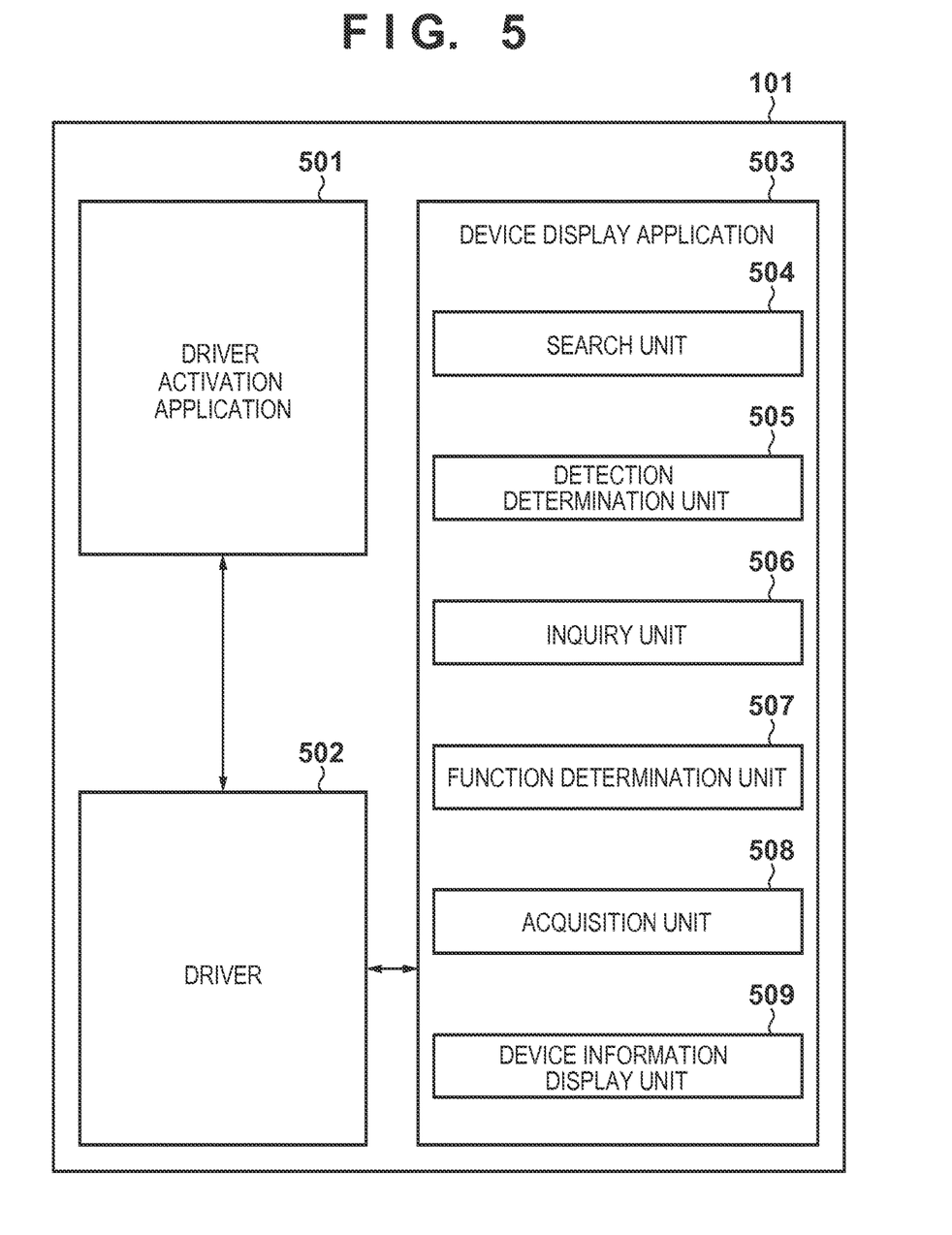
FIG. 5 is a block diagram showing the software arrangement of the PC according to the first embodiment.

FIG. 5 is a block diagram showing the software arrangement of the PC 101 according to the first embodiment.

Various components shown in FIG. 5 are implemented when a CPU 202 of the PC 101 reads out programs stored in a ROM 203, and executes the programs.

A driver activation application 501 is an application for activating a driver (device driver) 502 such as a printer driver or scanner driver and executing printing or scanning. Assume that the driver 502 controls the device using the proprietary protocol. A device display application 503 is an application having a function of searching for devices on the network, displaying a list of the detected devices on a display 201, and prompting the user to select a desired device. In this example, the device display application 503 executes no device search using Bonjour.

For example, when performing printing, if the user instructs to perform printing while the driver activation application 501 prepares data to be printed, the device display application 503 displays candidates of a device (printer) to perform printing. When the user selects a desired device, the driver (printer driver) 502 corresponding to the selected device is specified, and used to send the data to be printed to the device, thereby executing printing. When performing scanning (reading a document), if scanning is instructed via the driver activation application 501, the device display application 503 displays candidates of a device (scanner) for performing scanning. When the user selects a desired device, the driver (scanner driver) 502 corresponding to the selected device is specified, and used to read an image on the document set on the device.

In the first embodiment, the device display application 503 includes a search unit 504, detection determination unit 505, inquiry unit 506, function determination unit 507, acquisition unit 508, and device information display unit 509.

The search unit 504 searches for a device on the network by sending a search request using the proprietary protocol. At the time of a search, the search unit 504 can search for a device having a designated service (printing or reading). The detection determination unit 505 determines the detected device by receiving, from the device, a response to the search request sent by the search unit 504.

The inquiry unit 506 sends an inquiry request to inquire whether a device on the network supports the Bonjour function and the Bonjour function is enabled. Examples of an inquiry method by the inquiry unit 506 are a method of issuing an inquiry using the proprietary protocol, and a method of issuing an inquiry using a protocol other than the proprietary protocol and Bonjour. If the inquiry unit 506 issues an inquiry using the proprietary protocol, the device returns, as a parameter of the proprietary protocol, data indicating whether the Bonjour function is enabled. On the other hand, if the inquiry unit 506 issues an inquiry using a protocol other than the proprietary protocol and Bonjour, information is acquired using HTTP or FTP for a device of which it is possible to inquire, using HTTP or FTP, whether the Bonjour function is enabled. At this time, an inquiry is issued by using HTTP or FTP with a MAC address or IP address acquired using the proprietary protocol. Based on contents of a response, from a device, to the inquiry of the inquiry unit 506, the function determination unit 507 determines whether the Bonjour function of the device is enabled.

The acquisition unit 508 acquires a Bonjour service name from a device for which the function determination unit 507 determines that the Bonjour function is enabled. The acquisition unit 508 has a method of acquiring a Bonjour service name using the proprietary protocol, and a method of acquiring a Bonjour service name using a protocol other than the proprietary protocol and Bonjour as methods of accruing a Bonjour service name. When acquiring a Bonjour service name using the proprietary protocol, the device returns the Bonjour service name as a parameter of the proprietary protocol. On the other hand, when acquiring a Bonjour service name using a protocol other than the proprietary protocol and Bonjour, the Bonjour service name is acquired using HTTP or FTP from a device of which it is possible to inquire, using HTTP or FTP, whether the Bonjour function is enabled, similarly to Bonjour. That is, the acquisition unit 508 acquires, using a communication protocol other than Bonjour, the Bonjour service name which is registered in the device and is to be originally sent in response to a device search using Bonjour.

The device information display unit 509 displays device information of the detected device on the display 201. The device information display unit 509 sets the Bonjour service name as device information to be preferentially processed (displayed). That is, if a Bonjour service name can be acquired, the Bonjour service name is displayed. Only if it is impossible to acquire a Bonjour service name, information (a Mac address or the like) other than a Bonjour service name is displayed.

Figure 6:
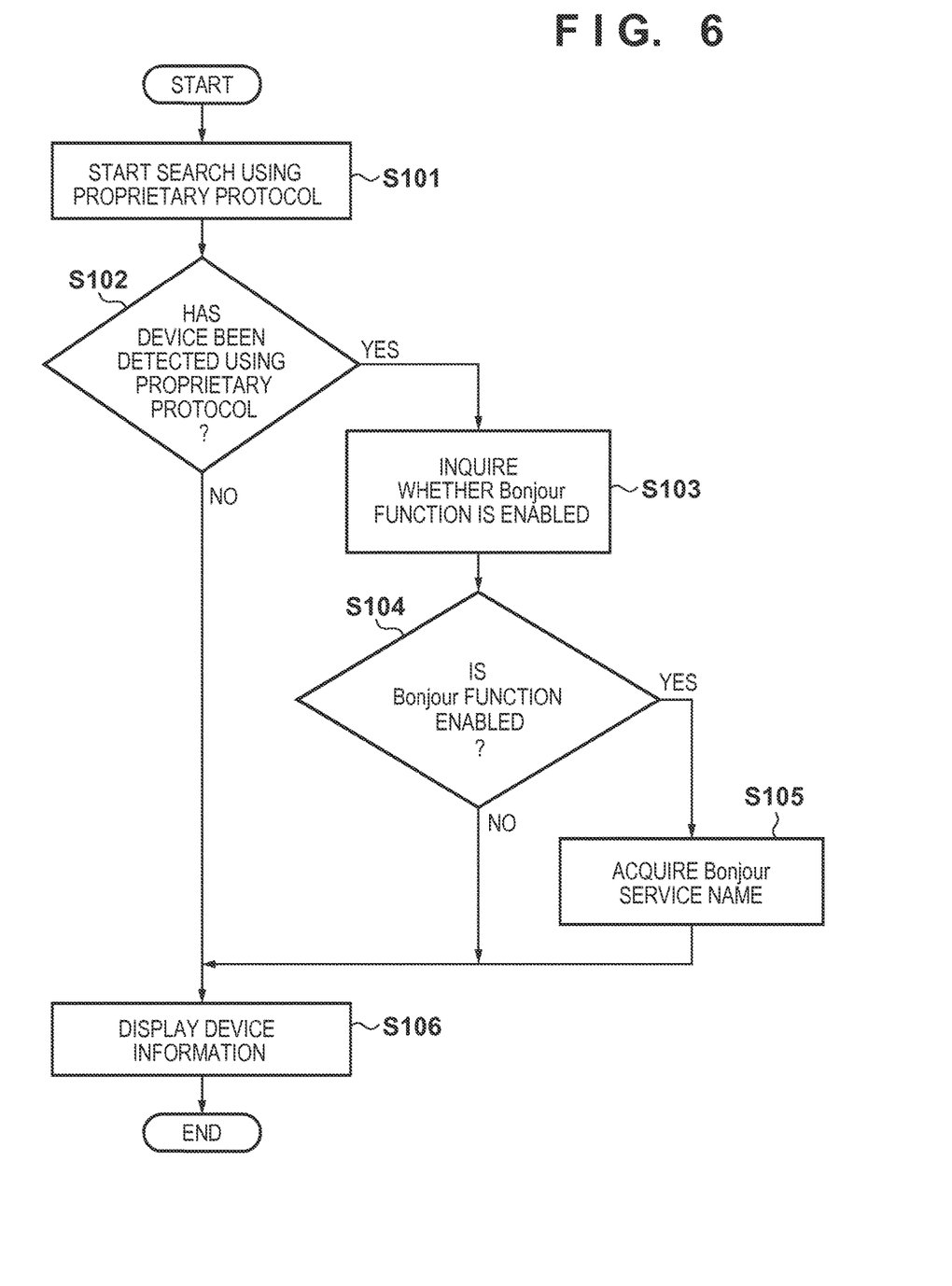
FIG. 6 is a flowchart illustrating processing executed by the PC according to the first embodiment.

FIG. 6 is a flowchart illustrating processing executed by the PC 101 according to the first embodiment. This flowchart shows a processing sequence performed when a program which corresponds to the device display application 503 and is stored in an auxiliary storage apparatus 205 is loaded to a RAM 204, and executed by the CPU 202.

In step S101, the search unit 504 starts at least a device search using the proprietary protocol. That is, the search unit 504 stands by for a response to a device search request using the proprietary protocol. In this example, a response is received from a device supporting the proprietary protocol but no response is received from a device which does not support the proprietary protocol (for example, a device supporting only Bonjour). At this time, a MAC address is acquired as device information from the device supporting the proprietary protocol. At this time, the device information display unit 509 stands by without displaying the device information. In step S102, based on the search result of the search unit 504, the detection determination unit 505 determines whether a device has been detected using the proprietary protocol. In this example, if a plurality of devices have been detected, subsequent processing is performed for each device.

If it is determined in step S102 that no device has been detected using the proprietary protocol (NO in step S102), the process advances to step S106. In this case, since there is no device information to be displayed by the device information display unit 509, information indicating that no device has been found (searched) is displayed.

On the other hand, if it is determined in step S102 that a device has been detected using the proprietary protocol (YES in step S102), in step S103 the inquiry unit 506 inquires of the detected device, using the proprietary protocol or a protocol other than the proprietary protocol and Bonjour, whether the Bonjour function is enabled.

In step S104, based on information acquired by the inquiry in step S103, the function determination unit 507 determines whether the Bonjour function is enabled. For a device (the device 402 in this example) for which it is determined that the Bonjour function is enabled (YES in step S104), in step S105, the acquisition unit 508 acquires, from the device, a Bonjour service name as device information using the proprietary protocol or a protocol other than the proprietary protocol and Bonjour. In step S106, the device information display unit 509 displays the acquired Bonjour service name as a selection candidate device on the display 201. At this time, the device information display unit 509 may display the Bonjour service name together with the acquired MAC address.

On the other hand, for a device (the device 401 in this example) for which it is determined in step S104 that the device has no Bonjour function or the Bonjour function is disabled (NO in step S104), in step S106, the device information display unit 509 displays, as device information, the MAC address acquired using the proprietary protocol on the display 201.

As described above, the device information display unit 509 displays the devices 401 and 402 as selection candidate devices on the display 201. In this case, the MAC address is displayed as device information for the device 401, and the Bonjour service name is displayed as device information for the device 402. At this time, a device which does not support the proprietary protocol is not displayed.

When the user selects one of the devices by a keyboard 206 or pointing device 207, the driver 502 corresponding to the selected device is specified and called. The called driver 502 communicates with the device using the proprietary protocol, and causes the device to execute processing.

Note that in the first embodiment, the proprietary protocol, Bonjour, HTTP, and FTP have been exemplified as communication protocols. However, other communication protocols may be used. For example, if there is a difference between pieces of device information acquirable using two communication protocols, the other communication protocols are applicable.

As described above, according to the first embodiment, it is possible to readily select a device which supports a communication protocol used by a driver to communicate with a device. At this time, since device information (for example, a Bonjour service name) registered in the device for another communication protocol is presented to the user, he/she can readily recognize that the corresponding device is a desired device. In this case, a device can unify its names (into a Bonjour service name, in this example). Therefore, for example, a single device does not have device names for the respective protocols, thereby preventing different names from being presented. At this time, a device (for example, an old-type device) whose device name is not registered can also be presented as a selection candidate. Note that if it is possible to acquire only a MAC address as device information from a device, a device name may be specified by additionally providing a database for associating the MAC address and the device name, and searching the database.

Second Embodiment

Figure 7:
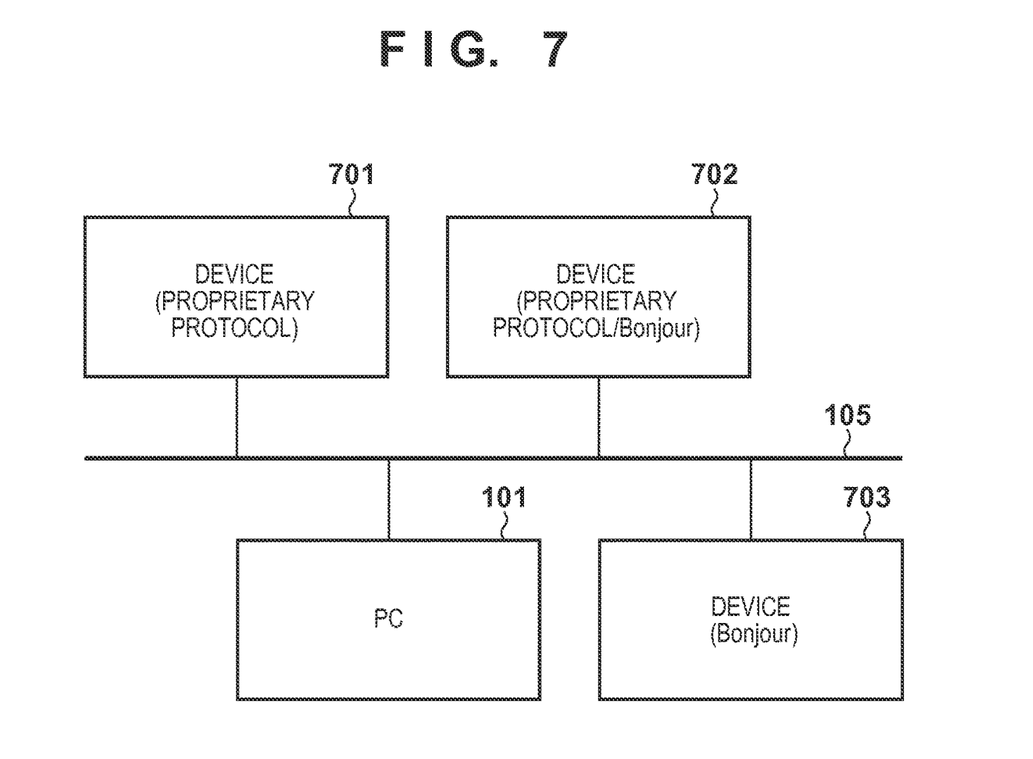
FIG. 7 is a block diagram showing the connection state between a PC and devices according to the second embodiment.

FIG. 7 is a block diagram showing the connection state between a PC and devices according to the second embodiment.

Referring to FIG. 7, a PC 101 and devices 701, 702, and 703 are connected via a network 105. The device 701 corresponds to the device 102 of FIG. 1, and supports only the proprietary protocol. The device 702 corresponds to the device 103 of FIG. 1, and supports two protocols, that is, the proprietary protocol and Bonjour. Furthermore, the device 703 corresponds to the device 104 of FIG. 1, and supports only Bonjour. An arrangement according to the second embodiment is different from that shown in FIG. 4 of the first embodiment, and further includes a device which does not support the proprietary protocol. Note that each of the devices 701, 702, and 703 responds to a search request from the PC 101, and other devices can be connected to the network 105. Note also that in the second embodiment, a device search is executed using both the proprietary protocol and Bonjour, and a search result obtained using Bonjour is prioritized.

Figure 8:
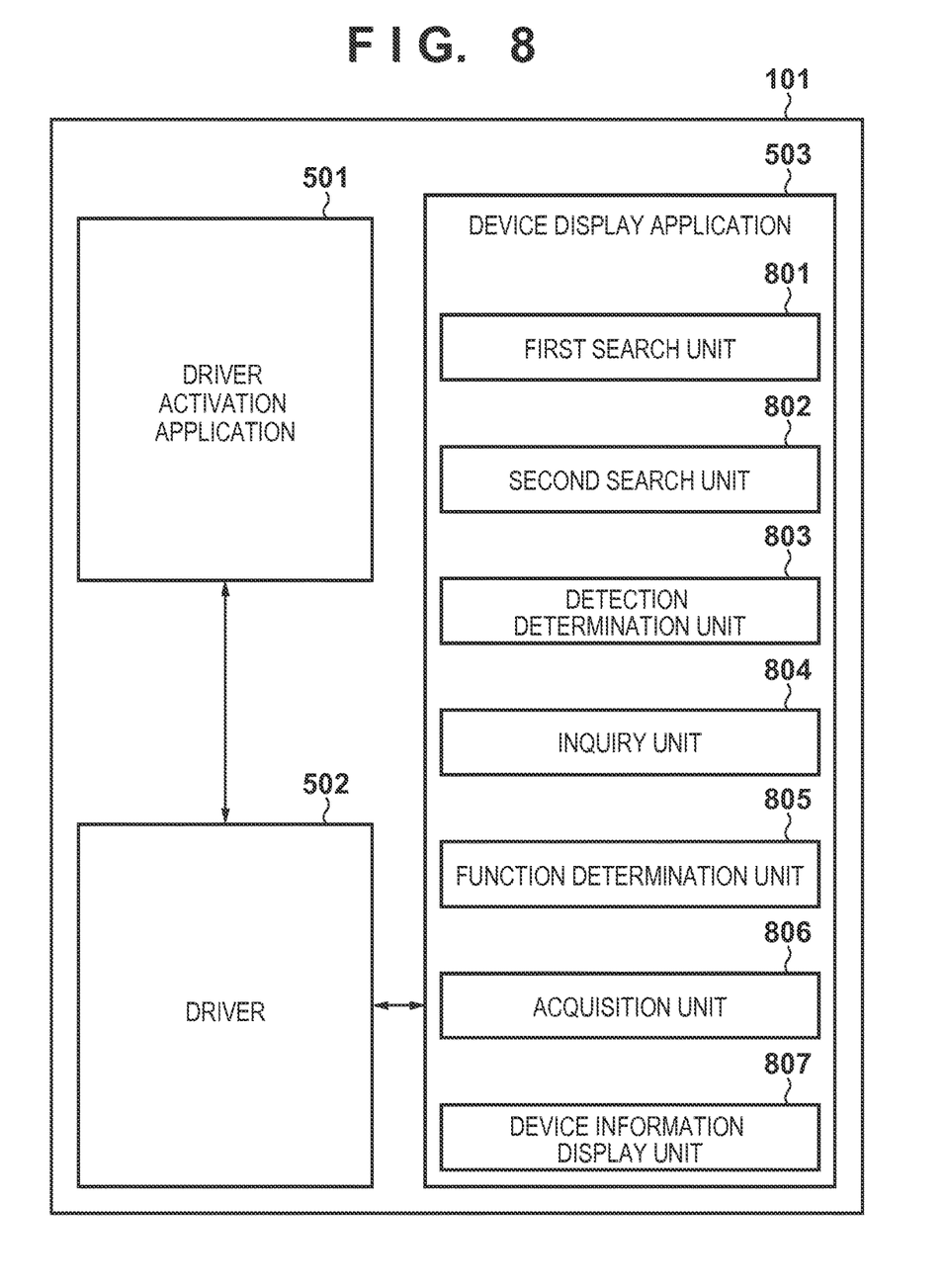
FIG. 8 is a block diagram showing the software arrangement of the PC according to the second embodiment.

FIG. 8 is a block diagram showing the software arrangement of the PC 101 according to the second embodiment.

The same reference numerals as those in FIG. 5 of the first embodiment denote the same components and a detailed description thereof will be omitted. Note that a driver 502 is not limited to a driver for communicating with a device using the proprietary protocol, and causing the device to execute processing. Various components shown in FIG. 8 are implemented when a CPU 202 of the PC 101 reads out programs stored in a ROM 203, and executes the programs.

A device display application 503 includes a first search unit 801, second search unit 802, detection determination unit 803, inquiry unit 804, function determination unit 805, acquisition unit 806, and device information display unit 807.

The first search unit 801 performs the same processing as that performed by the search unit 504, and searches for a device using the proprietary protocol. The first search unit 801 can search for a device supporting a designated service. The second search unit 802 searches for a device on a network by sending a search request using Bonjour as a discovery communication protocol. The second search unit 802 can search for a device supporting the designated service. The detection determination unit 803 determines the detected device by receiving, from the device, a response to the search request sent by the first search unit 801, and the detected device by receiving, from the device, a response to the search request sent by the second search unit 802. The detection determination unit 803 also determines whether the search request sent by the first search unit 801 has been received while no response to the search request sent by the second search unit 802 has been received. Whether the detected devices by the two search operations are the same can be determined by, for example, comparing MAC addresses contained in the responses to the search requests. If the MAC addresses are identical, it can be determined that the devices are the same.

The inquiry unit 804 performs the same processing as that performed by the inquiry unit 506, and uses the proprietary protocol or a protocol other than the proprietary protocol and Bonjour to inquire whether a device on the network supports the Bonjour function and the Bonjour function is enabled. The function determination unit 805 performs the same processing as that performed by the function determination unit 507, and determines whether the Bonjour function of the device is enabled, based on contents of a response, from the device, to the inquiry by the inquiry unit 804.

The acquisition unit 806 performs the same processing as that performed by the acquisition unit 508, and uses the proprietary protocol or a protocol other than the proprietary protocol and Bonjour to acquire a Bonjour service name from a device for which the function determination unit 805 determines that the Bonjour function is enabled. The acquisition unit 806 may stand by for a response to the search request sent by the second search unit 802, and acquire a Bonjour service name by receiving the response. In this case, for a device which has not returned a response even when a predetermined time elapses after the second search unit 802 sends the search request, the acquisition unit 806 determines that it cannot acquire a Bonjour service name using Bonjour.

The device information display unit 807 displays device information of the found device on the display 201. The device information display unit 807 preferentially displays the device information using a Bonjour service name. Even if a MAC address is already acquired as device information, the device information display unit 807 suspends display of the device information until a Bonjour service name can be acquired or it is determined that no Bonjour service name can be acquired. If a Bonjour service name can be acquired, the device information display unit 807 displays the Bonjour service name as device information. If it is determined that no Bonjour service name can be acquired, the device information display unit 807 displays the MAC address.

Figure 9:
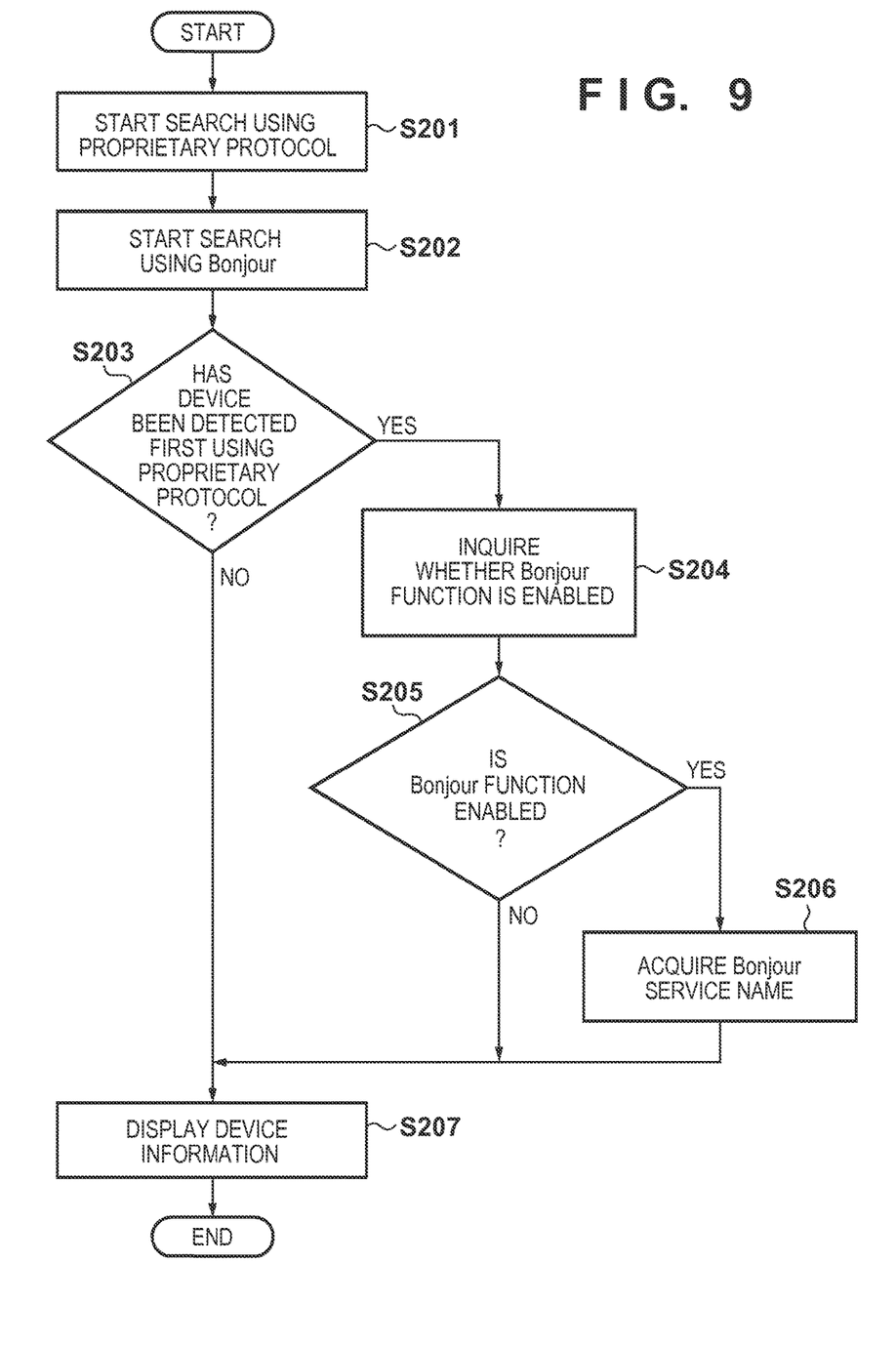
FIG. 9 is a flowchart illustrating processing executed by the PC according to the second embodiment.

FIG. 9 is a flowchart illustrating processing executed by the PC 101 according to the second embodiment. This flowchart shows a processing sequence performed when a program which corresponds to the device display application 503 and is stored in an auxiliary storage apparatus 205 is loaded to a RAM 204, and executed by the CPU 202.

In step S201, the first search unit 801 performs a device search using the proprietary protocol. That is, the first search unit 801 stands by for a response to a device search request using the proprietary protocol. In this example, a response is received from a device supporting the proprietary protocol but no response is received from a device which does not support the proprietary protocol (for example, a device supporting only Bonjour). At this time, a MAC address is acquired as device information from the device supporting the proprietary protocol. At this time, the device information display unit 807 stands by without displaying the device information.

In step S202, the second search unit 802 performs a device search using Bonjour. That is, the second search unit 802 stands by for a response to a device search request using the Bonjour protocol. In this case, a response is received from a device supporting Bonjour but no response is received from a device which does not support Bonjour (for example, a device supporting only the proprietary protocol). At this time, a Bonjour service name is acquired as device information from the device supporting Bonjour. Note that the order of steps S201 and S202 may be reversed or steps S201 and S202 may be performed at the same time. At this time, if a plurality of devices have been detected, subsequent processing is performed for each device. In step S203, based on the search results of the first search unit 801 and second search unit 802, the detection determination unit 803 determines whether a device has been detected first using the proprietary protocol.

If it is determined in step S203 that there is a device which has been detected first using Bonjour instead of the proprietary protocol (NO in step S203), in step S207 the device information display unit 807 displays a Bonjour service name acquired using Bonjour as device information. In this example, even if a device is detected using the proprietary protocol after the device is detected using Bonjour, a Bonjour service name is displayed as device information.

On the other hand, for a device which has been detected first using the proprietary protocol (YES in step S203), in step S204, the inquiry unit 804 inquires of the detected device whether the Bonjour function is enabled.

In step S205, the function determination unit 805 determines whether the Bonjour function is enabled. If the Bonjour function is enabled (YES in step S205), the acquisition unit 806 acquires a Bonjour service name in step S206. That is, similarly to step S105, the acquisition unit 806 acquires a Bonjour service name using the proprietary protocol or a protocol other than the proprietary protocol and Bonjour. Alternatively, if the acquisition unit 806 stands by for a response to the search request in step S202 from the same device for a predetermined time, and can receive the response, it acquires a Bonjour service name contained in the response. When acquiring a Bonjour service name using Bonjour, whether the devices are the same is determined by, for example, comparing the MAC address acquired using the proprietary protocol with that acquired using Bonjour. Note that if it can be determined that the devices are the same, information other than the MAC address may be used.

As described above, after obtaining the Bonjour service name, the device information display unit 807 displays the Bonjour service name as device information in step S207. Note that the MAC address is never displayed as device information before the Bonjour service name is acquired.

On the other hand, for a device for which it is determined in step S205 that the Bonjour function is disabled (NO in step S205), in step S207, the device information display unit 807 displays, as device information, the MAC address acquired by the detection processing using the proprietary protocol. Note that in the second embodiment, whether the device supports a protocol to be used by the driver 502 to control a device may also be determined based on the acquired device information, and the device information display unit 807 may display only a device controllable by the driver 502. For example, if the driver 502 controls a device using the proprietary protocol, and a Bonjour service name is acquired using Bonjour, the device information display unit 807 displays a device for which pieces of device information can be acquired using the proprietary protocol and Bonjour.

In the second embodiment, the proprietary protocol, Bonjour, HTTP, and FTP have been exemplified as communication protocols. However, other communication protocols may be used. For example, if there is a difference between pieces of device information acquirable using two communication protocols, the other communication protocols are applicable.

As described above, in the second embodiment, a case has been explained in which there are various devices on the network, such as a device supporting only the proprietary protocol, a device supporting only Bonjour, and a device supporting both the protocols. In this case, it is possible to preferentially present, to the user, device information according to a preferential protocol by performing a search using a plurality of protocols. Therefore, a device name (service name) is presented by an expression readily recognized by the user, and thus the user readily selects a device. A device displayed using a Bonjour service name can commonly use the same device name for wired communication and wireless communication.

Other Embodiments

In the aforementioned embodiments, Ethernet in a wired network is used as a communication interface between a PC and devices. The present invention, however, is not limited to this. For example, various interfaces such as a wireless LAN, IEEE1394, and Bluetooth® can be used.

Furthermore, in the aforementioned embodiments, Bonjour has been exemplified as a discovery protocol which is one of a plurality of kinds of communication protocols. The present invention, however, is not limited to this. For example, another standard protocol such as WSD or another proprietary protocol may be used, or a device including a plurality of protocols may be used.

Although a case in which acquired device information is displayed to be presented to the user has been described in the above embodiments, acquired device information may be used for purposes other than a display purpose. For example, acquired device information may be registered in a predetermined database.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-256438, filed Dec. 11, 2013, which is hereby incorporated by reference herein in its entirety.

What is claimed is:

1. An information processing apparatus comprising:
a processor and a memory storing computer code that, when executed by the processor, causes the processor to execute:
searching for a device on a network using a first protocol, wherein device information obtained using the first protocol does not include a device name;
searching for a device on a network using a second protocol different from the first protocol, wherein device information obtained using the second protocol includes a device name, and a search result obtained using the second protocol is prioritized over a search result obtained using the first protocol;
causing, in a case where the a device was detected using the second protocol before detection of the device using the first protocol, a display to display a device name of the detected device based on device information obtained using the second protocol; and
performing, in a case where a device was detected using the first protocol before detection of the device using the second protocol, a suspension process for suspending display of identification information obtained using the first protocol and an inquiry of whether or not the detected device supports the second protocol, wherein a display process for identification information obtained using the first protocol is suspended until a response to the inquiry is received,
wherein in a case where a device was detected using the first protocol before detection of the device using the second protocol, then in dependence on whether the detected device does or does not support the second protocol,
causing, in a case where the detected device supports the second protocol, the display to display a device name of the detected device based on device information obtained using the second protocol, and
causing, in a case where the detected device does not support the second protocol, the display to display identification information for which the display process is suspended, and
wherein in a case where a device was detected using the second protocol before detection of the device using the first protocol, the inquiry is not performed.

2. The apparatus according to claim 1, wherein the inquiring unit performs the inquiry to the detected device using the first protocol.

3. An information processing method executed by a processor of an information processing apparatus, comprising:
searching for a device on a network using a first protocol, wherein device information obtained using the first protocol does not include a device name;
searching for a device on a network using a second protocol different from the first protocol, wherein device information obtained using the second protocol includes a device name, and a search result obtained using the second protocol is prioritized over a search result obtained using the first protocol;
causing, in a case where the a device was detected using the second protocol before detection of the device using the first protocol, a display to display a device name of the detected device based on device information obtained using the second protocol; and
performing, in a case where a device was detected using the first protocol before detection of the device using the second protocol, a suspension process for suspending display of identification information obtained using the first protocol and an inquiry of whether or not the detected device supports the second protocol, wherein a display process for identification information obtained using the first protocol is suspended until a response to the inquiry is received,
wherein in a case where a device was detected using the first protocol before detection of the device using the second protocol, then in dependence on whether the detected device does or does not support the second protocol,
causing, in a case where the detected device supports the second protocol, the display to display a device name of the detected device based on device information obtained using the second protocol, and
causing, in a case where the detected device does not support the second protocol, the display to display identification information for which the display process is suspended, and
wherein in a case where a device was detected using the second protocol before detection of the device using the first protocol, the inquiry is not performed.

4. The method according to claim 3, wherein the inquiry is performed to the detected device using the first protocol.

5. A non-transitory computer-readable storage medium storing code of a program for causing a computer to execute an information processing method, the program comprising:
    code for searching for a device on a network using a first protocol wherein device information obtained using the first protocol does not include a device name;
    code for searching for a device on a network using a second protocol different from the first protocol, wherein device information obtained using the second protocol includes a device name, and a search result obtained using the second protocol is prioritized over a search result obtained using the first protocol;
    code for causing, in a case where the a device was detected using the second protocol before detection of the device using the first protocol, a display to display a device name of the detected device based on device information obtained using the second protocol;
    code for performing, in a case where a device was detected using the first protocol before detection of the device using the second protocol, a suspension process for suspending display of identification information obtained using the first protocol and an inquiry of whether or not the detected device supports the second protocol, wherein a display process for identification information obtained using the first protocol is suspended until a response to the inquiry is received; and
    code for, in a case where a device was detected using the first protocol before detection of the device using the second protocol, then in dependence on whether the detected device does or does not support the second protocol,
        causing, in a case where the detected device supports the second protocol, the display to display a device name of the detected device based on device information obtained using the second protocol, and
        causing, in a case where the detected device does not support the second protocol, the display to display identification information for which the display process is suspended, and
    wherein in a case where a device was detected using the second protocol before detection of the device using the first protocol, the inquiry is not performed.

6. The medium according to claim 5, wherein the inquiry is performed to the detected device using the first protocol.

7. The apparatus according to claim 1, wherein a MAC address is displayed as the identification information based on device information obtained using the first protocol.

8. The apparatus according to claim 1, further comprising a printing unit configured to perform print processing on a recording medium.

9. The method according to claim 3, wherein a MAC address is displayed as the identification information based on device information obtained using the first protocol.

10. The method according to claim 3, further comprising performing print processing on a recording medium.

11. The medium according to claim 5, wherein a MAC address is displayed as the identification information based on device information obtained using the first protocol.

12. The medium according to claim 5, wherein the program further comprises code for performing print processing on a recording medium.

13. The apparatus according to claim 1, wherein the inquiring unit performs the inquiry to the detected device using a third protocol different from the first and the second protocols.

14. The method according to claim 3, wherein the inquiry is performed to the detected device using a third protocol different from the first and the second protocols.

15. The medium according to claim 5, wherein the inquiry is performed to the detected device using a third protocol different from the first and the second protocols.

16. The apparatus according to claim 1, further comprising a driver that uses the first protocol for controlling a device, and
    in a case where a first device does not support the first protocol and a second device does support the first protocol, the display control unit causes the display unit to not display information for the first device but to display a device name or identification information of the second device.

17. The method according to claim 3, wherein the information processing apparatus includes a driver that uses the first protocol for controlling a device, and
    in a case where a first device does not support the first protocol and a second device does support the first protocol, the display is caused to not display information for the first device but to display a device name or identification information of the second device.

18. The medium according to claim 5, wherein the computer includes a driver that uses the first protocol for controlling a device, and
    in a case where a first device does not support the first protocol and a second device does support the first protocol, the display is caused to not display information for the first device but to display a device name or identification information of the second device.

* * * * *